(12) United States Patent
Fan Jiang et al.

(10) Patent No.: US 7,719,649 B2
(45) Date of Patent: May 18, 2010

(54) LIQUID CRYSTAL DISPLAY PANEL

(75) Inventors: Shih-Chyuan Fan Jiang, Hsinchu (TW); Ping-Ju Jiang, Hsinchu (TW); Ying-Ru Chen, Hsinchu (TW); Ching-Huan Lin, Hsinchu (TW); Chih-Ming Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 216 days.

(21) Appl. No.: 11/957,488

(22) Filed: Dec. 17, 2007

(65) Prior Publication Data

US 2008/0218674 A1 Sep. 11, 2008

(30) Foreign Application Priority Data

Mar. 9, 2007 (TW) .............................. 96108369 A

(51) Int. Cl.
G02F 1/1337 (2006.01)
(52) U.S. Cl. .................. 349/129; 139/145; 139/141; 139/38; 139/39; 139/114
(58) Field of Classification Search ....................... None
See application file for complete search history.

(56) References Cited

U.S. PATENT DOCUMENTS 6,567,139 B2 5/2003 Huang
7,511,789 B2 * 3/2009 Inoue et al. ................. 349/129
2005/0195353 A1 9/2005 Park et al.
2005/0237459 A1 10/2005 Ikeda et al.
2006/0262240 A1 * 11/2006 Anno et al. ................. 349/44
2007/0153141 A1 * 7/2007 Tsai et al. ................... 349/38

FOREIGN PATENT DOCUMENTS

| CN | 1690812 | 11/2005 |
| CN | 1743923 | 3/2006 |
| CN | 1818758 | 8/2006 |
| KR | 2003015452 | 2/2003 |
| TW | 113774 | 4/2000 |

* cited by examiner

Primary Examiner—Richard H Kim
(74) Attorney, Agent, or Firm—Jianq Chyun IP Office

(57) ABSTRACT

A liquid crystal display (LCD) panel including an active device array substrate, an opposite substrate and a liquid crystal layer is provided. The active device array substrate includes a substrate, a plurality of scan lines, a plurality of data lines, and a plurality of pixel units. The scan lines, the data lines and the pixel units are disposed on the substrate. Each of the pixel units is electrically connected to one of the scan lines and one of the data lines correspondingly and crosses over two sides of the corresponding scan line. The opposite substrate includes a plurality of alignment protrusions. The alignment protrusions are located over the scan lines. Besides, the liquid crystal layer is disposed between the opposite substrate and the active device array substrate. The above-mentioned liquid crystal display panel has higher aperture ratio.

22 Claims, 6 Drawing Sheets

LIQUID CRYSTAL DISPLAY PANEL

CROSS-REFERENCE TO RELATED APPLICATION

This application claims the priority benefit of Taiwan application serial no. 96108369, filed on Mar. 9, 2007. The entirety of the above-mentioned patent application is hereby incorporated by reference herein and made a part of this specification.

BACKGROUND OF THE INVENTION

1. Field of the Invention

The present invention relates to a liquid crystal display (LCD) panel, and more particularly to an LCD panel with high aperture ratio.

2. Description of Related Art

Nowadays, the performance requirements the market demands of the LCD are such as high contrast ratio, no gray scale inversion, little color shift, high luminance, high color vividness, high color saturation, quick response and wide viewing angle. Currently, several types of display devices can meet the requirement of wide viewing angles, such as the twisted nematic (TN) LCD along with a wide viewing film, the in-plane switching (IPS) LCD, the fringe field switching (FFS) LCD, and multi-domain vertical alignment (MVA) LCD. A description of the conventional MVA LCD panel is provided as follows.

Most of the conventional MVA LCD panel utilizes alignment protrusions and the alignment slits of pixel electrodes to arrange liquid crystal molecules as multi-domain so that the effect of wide viewing angle is achieved. Yet, the tilt of the liquid crystal molecules located at the periphery of the alignment protrusions is difficult to control due to an electric field from the scan line and thereby resulting in the light leakage. Hence, a black matrix having light-shielding function is needed to be disposed so as to prevent the display quality of the LCD panel from being deteriorated.

SUMMARY OF THE INVENTION

The present invention provides a liquid crystal display (LCD) panel with higher aperture ratio.

An LCD panel including an active device array substrate, an opposite substrate and a liquid crystal layer is disclosed. The active device array substrate includes a substrate, a plurality of scan lines, a plurality of data lines, and a plurality of pixel units. The scan lines, the data lines and the pixel units are disposed on the substrate. Each of the pixel units is electrically connected to one of the scan lines and one of the data lines correspondingly and crosses two sides of the corresponding scan line. The opposite substrate has a plurality of alignment protrusions. The alignment protrusions are located over the scan lines. Moreover, the liquid crystal layer is disposed between the opposite substrate and the active device array substrate.

An LCD panel including an active device array substrate, an opposite substrate and a liquid crystal layer is also disclosed. The active device array substrate includes a substrate, a plurality of common lines, a plurality of data lines, a plurality of scan lines, and a plurality of pixel units. The common lines and the data lines are disposed on the substrate so as to define a plurality of pixel regions. Each of the scan lines is located between two adjacent common lines, and the pixel units are respectively disposed on one of the pixel regions on the substrate. Each of the pixel units is electrically connected to one of the scan lines and one of the data lines correspondingly. The opposite substrate has a plurality of alignment protrusions disposed thereon. The alignment protrusions are located over the scan lines. Furthermore, the liquid crystal layer is disposed between the opposite substrate and the active device array substrate.

In one embodiment of the invention, each of the pixel units includes an active device and a pixel electrode. The active device is electrically connected to one of the scan lines and one of the data lines correspondingly. The pixel electrode and the active device are electrically connected.

In one embodiment of the invention, each of the pixel units has a first region and a second region. The alignment protrusions, for example, are located over the first region and the second region respectively. Additionally, the pixel unit may have a first pixel electrode and a second pixel electrode. The first pixel electrode and the second pixel electrode are located in the first region and the second region respectively.

In one embodiment of the invention, the first pixel electrode is a transparent electrode, and the second pixel electrode is a transparent electrode. In a preferred embodiment of the invention, the scan lines may be located under the first pixel electrode or under the second pixel electrode.

In one embodiment of the invention, the second pixel electrode is a reflective electrode, and the scan lines may be located under the first pixel electrode.

In one embodiment of the invention, the active device array substrate further includes a plurality of bumps disposed under the second pixel electrode.

In one embodiment of the invention, the active device array substrate further includes a pad layer disposed under the second pixel electrode.

In one embodiment of the present invention, the opposite substrate further includes a pad layer located over the second pixel electrode.

In one embodiment of the invention, the scan lines have a plurality of ring-shaped patterns. The ring-shaped patterns are located under the alignment protrusions respectively so as to surround the periphery of the alignment protrusions. The ring-shaped patterns include polygonal frame pattern, circular frame pattern or other geometric frame patterns.

In one embodiment of the invention, the opposite substrate further includes a black matrix disposed corresponding to the alignment protrusions.

In one embodiment of the invention, the active device array substrate further includes a common line disposed among the pixel units.

In one embodiment of the invention, the common line and each of the pixel electrodes overlapped with the common line form a storage capacitor.

In one embodiment of the invention, the width of a portion of the data lines across with the common line and a portion of the data lines adjacent to the storage capacitor is smaller than the width of the other portions of data lines.

The scan lines of embodiments disclosed in the invention are disposed under the alignment protrusions, which renders the scan lines having the light-shielding function overlapped with the black matrix. In an embodiment of the invention, the scan lines can be utilized to shield the periphery of the alignment protrusions so that the light leakage is mitigated. Therefore, the LCD panel of embodiments in the invention has higher aperture ratio and higher contrast ratio. In addition, in an embodiment of the invention, the width of a portion of the data lines is reduced so that the storage capacitor can extend toward the data lines and thereby further improving the aperture ratio of the LCD panel.

In order to make the above and other features and advantages of the present invention more comprehensible, several embodiments accompanied with figures are described in detail below.

DESCRIPTION OF EMBODIMENTS

The First Embodiment

Figure 1A:
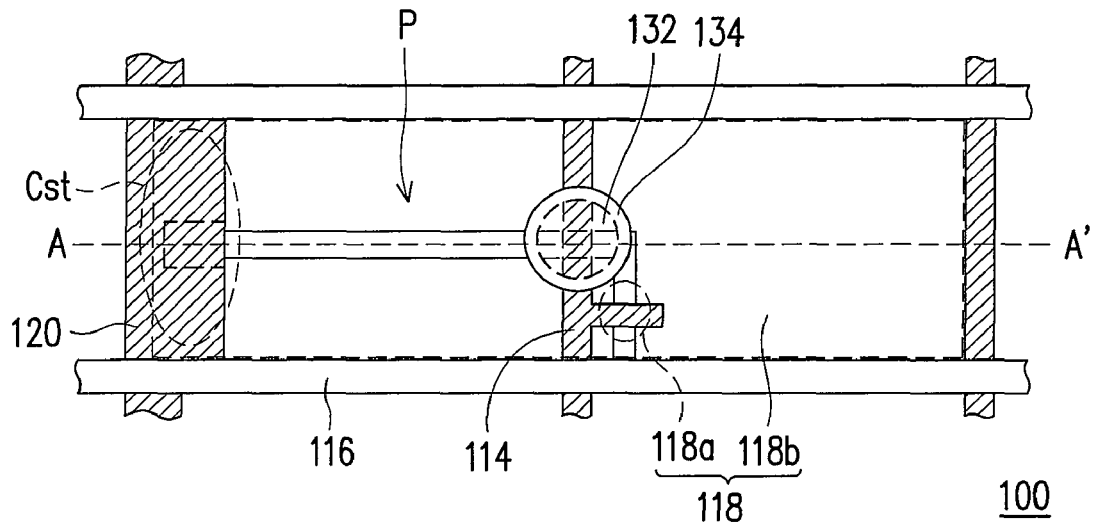
FIG. 1A is a top view of the liquid crystal display (LCD) panel according to the first embodiment of the present invention.
Figure 1B:
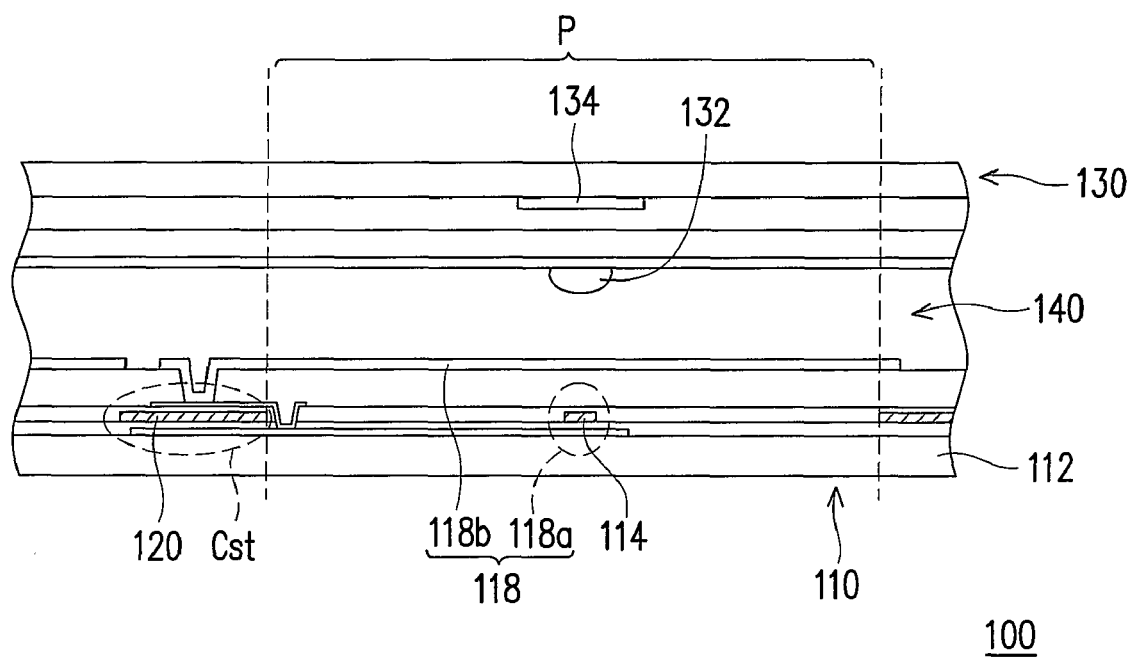
FIG. 1B is a schematic cross-sectional view of FIG. 1A along the sectioning line A-A'.

FIGS. 1A and 1B respectively show a top view and a schematic cross-sectional view of the liquid crystal display (LCD) panel according to the first embodiment of the invention. Referring to both FIGS. 1A and 1B, an LCD panel 100 of the present embodiment includes an active device array substrate 110, an opposite substrate 130 and a liquid crystal layer 140. The active device array substrate 110 includes a substrate 112 along with a plurality of scan lines 114, a plurality of data lines 116 and a plurality of pixel units 118 disposed thereon. Each of the pixel units 118 is electrically connected to the corresponding scan line 114 and the corresponding data line 116. The pixel unit 118 crosses two sides of the corresponding scan line 114. The opposite substrate 130 has alignment protrusions 132 disposed thereon and the alignment protrusions are located over the scan lines 114. A liquid crystal layer 140 is disposed between the opposite substrate 130 and the active device array substrate 110.

As shown in FIGS. 1A and 1B, each of the pixel unit 118 includes an active device 118a and a pixel electrode 118b. The active device 118a is electrically connected to the corresponding scan line 114 and the corresponding data line 116, and the pixel electrode 118b is electrically connected to the active device 118a. In addition, the active device array substrate 110 has a common line 120, and the common line 120 is disposed among the pixel units 118. The common line 120 and each of the pixel electrodes 118b overlapped with the common line 120 form a storage capacitor Cst. As shown in FIGS. 1A and 1B, each of the pixel unit 118 is located within a pixel region P defined by two adjacent common lines 120 and two adjacent data lines 116. The scan line 114 electrically connected to the pixel unit 118 is located between two adjacent common lines.

The alignment protrusions 132 on the opposite substrate 130 can arrange the liquid crystal molecules in the liquid crystal layer 140 as multi-domain, therefore the LCD panel 100 has the characteristic of wide viewing angle. However, it is difficult to control the arrangement of the liquid crystal molecules on the periphery of the alignment protrusions 132, which often results in light leakage. Hence, a black matrix 134 disposed corresponding to the alignment protrusions 132 can be fabricated on the opposition substrate 130, which renders the area of the black matrix 134 having light-shielding function slightly greater than the area of the alignment protrusions 132. In the embodiment, the light leakage occurring in the LCD panel 100 can be effectively reduced and thus enhancing the display quality of the LCD panel.

In this embodiment, the scan lines 114 is overlapped with the black matrix 134 that is disposed corresponding to the alignment protrusions 132. Therefore, the area of disclination region in the pixel unit 118 can be reduced as much as possible and thereby increasing the aperture ratio of the LCD panel 100.

The Second Embodiment

In order to disclose the spirit of the invention in more detail, the structure of the LCD panel in the second embodiment of the invention is provided herein.

Figure 2A:
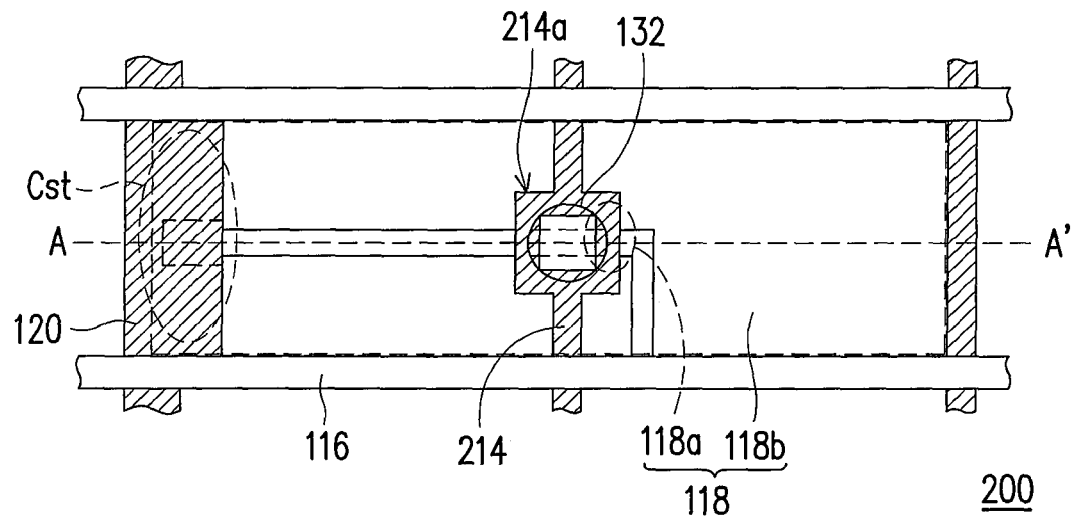
FIG. 2A is a top view of the LCD panel according to the second embodiment of the invention.
Figure 2B:
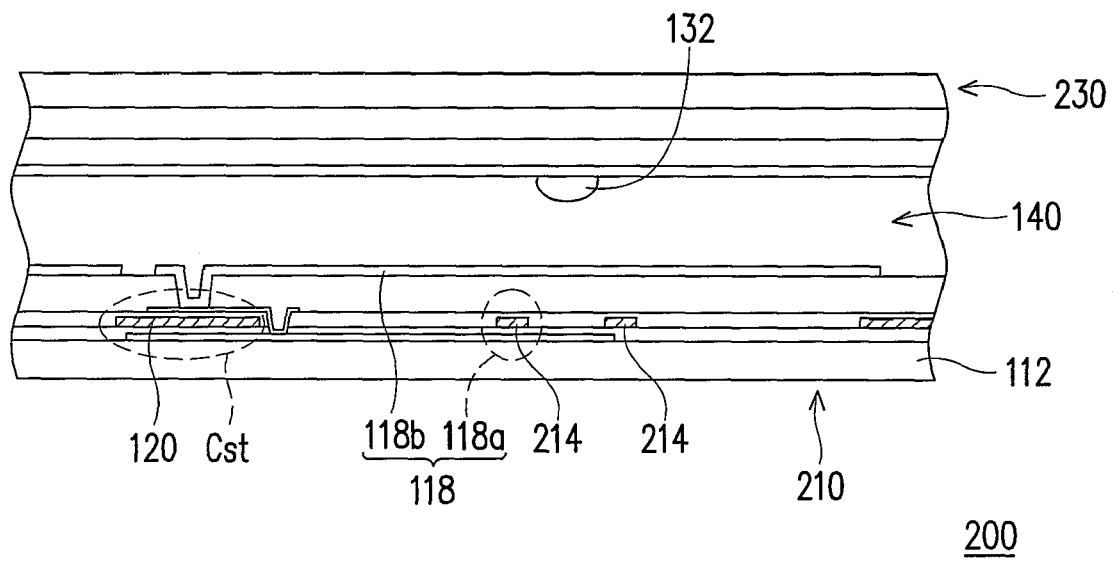
FIG. 2B is a schematic cross-sectional view of FIG. 2A along the sectioning line A-A'.

FIG. 2A shows a schematic top view of the LCD panel according to the second embodiment of the invention, and FIG. 2B is a schematic cross-sectional view of FIG. 2A along the sectioning line A-A'. Referring to both FIGS. 2A and 2B, an LCD panel 200 of the present embodiment is similar to the LCD panel 100 of the first embodiment. The same element reference labels in FIGS. 2A and 2B represent the same elements as those in FIG. 1, and thus are not to be reiterated herein. In the LCD panel 200, no black matrix 134 is required to be disposed on an opposite substrate 230 to shield the light. Scan lines 214 on an active device array substrate 210 are designed as having a ring-shaped pattern 214a. In an alternative embodiment, a plurality of ring-shaped patterns (not shown) that is not connected to the scan lines 214 can also be provided to reduce the light leakage. The ring-shaped pattern 214a corresponds to each of the alignment protrusions 132 respectively and is utilized to shield the light surrounding the alignment protrusions 132.

The plurality of ring-shaped patterns 214a of the scan lines 214 is respectively located under the alignment protrusions 132 so as to surround the periphery of the alignment protrusions 132. In the present embodiment, the ring-shaped pattern 214a is a rectangular frame pattern. In other embodiments, the ring-shaped pattern 214a may also be a polygonal frame pattern, a circular frame pattern or other geometric frame patterns. It should be noted that with the ring-shaped pattern 214a, no black matrix is required to be disposed around the alignment protrusion 132 and the fabrication cost can thereby be reduced. Moreover, since the ring-shaped pattern 214a renders the center of the alignment protrusion 132 still transparent, the present embodiment can further increase the aperture ratio of the LCD panel 200.

The Third Embodiment

Figure 3A:
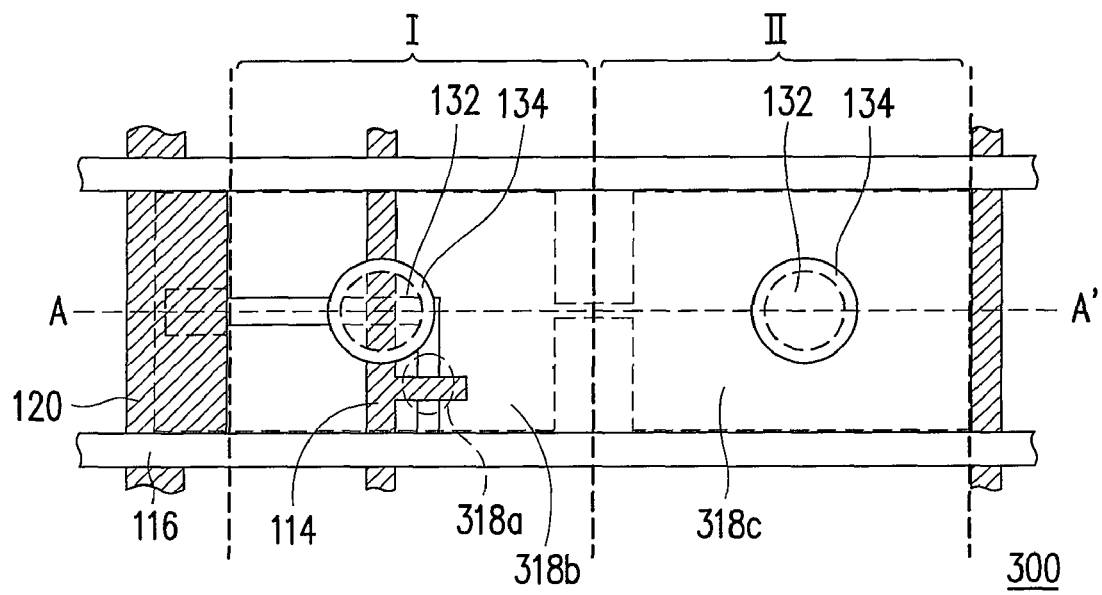
FIG. 3A is a top view of the LCD panel according to the third embodiment of the invention.
Figure 3B:
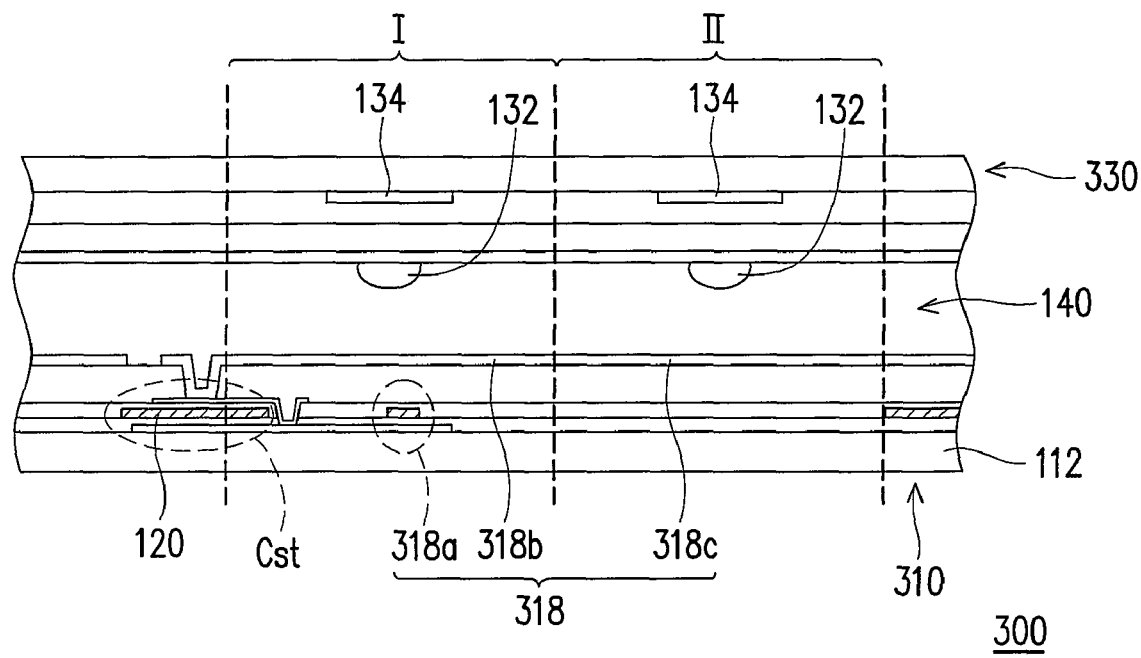
FIG. 3B is a schematic cross-sectional view of FIG. 3A along the sectioning line A-A'.

FIG. 3A shows a schematic top view of the LCD panel according to the third embodiment of the invention, and FIG. 3B is a schematic cross-sectional view of FIG. 3A along the sectioning line A-A'. Referring to both FIGS. 3A and 3B, an LCD panel 300 of the present embodiment is similar to the LCD panel 100. In the LCD panel 300, each of pixel units 318 has a first region I and a second region II. The alignment protrusions 132, for example, are located over the first region I and the second region II respectively. Additionally, the pixel unit 318 may have a first pixel electrode 318b and a second pixel electrode 318c. The first pixel electrode 318b and the second pixel electrode 318c are connected and located within the first region I and the second region II respectively.

In the present embodiment, both the first pixel electrode 318b and the second pixel electrode 318c are transparent electrodes. The scan lines 114 are located under the first pixel electrode 318b. In other embodiments, scan lines 314 may also be located under the second pixel electrode 318c. As shown in FIGS. 3A and 3B, since the scan lines 314 are located under the alignment protrusions 132 and the black matrix 134, the LCD panel 300 has a higher aperture ratio. Besides, the scan lines 114 under the alignment protrusions 132 may also be designed as a ring-shaped pattern (as shown in FIGS. 2A and 2B) which is the same as the design of the LCD panel 200. Thus, the LCD panel 300 not only has a higher aperture ratio but its fabrication cost is reduced.

The Fourth Embodiment

Figure 4A:
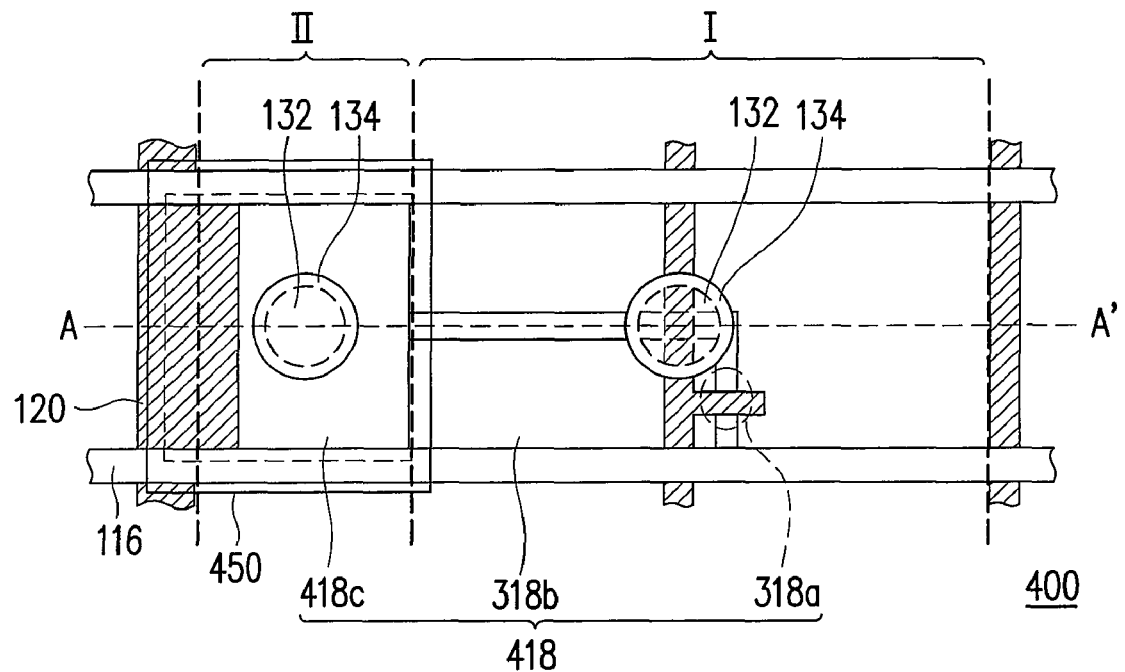
FIG. 4A is a top view of the LCD panel according to the fourth embodiment of the invention.
Figure 4B:
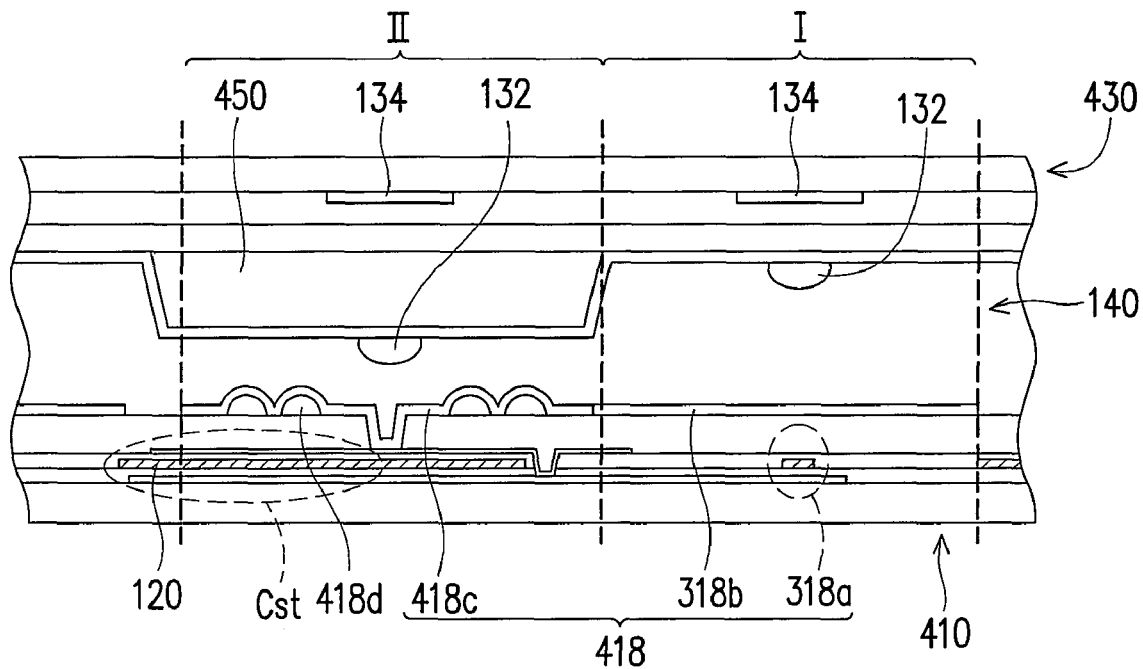
FIGS. 4B and 4C are schematic cross-sectional views of FIG. 4A along the sectioning line A-A'.
Figure 4C:
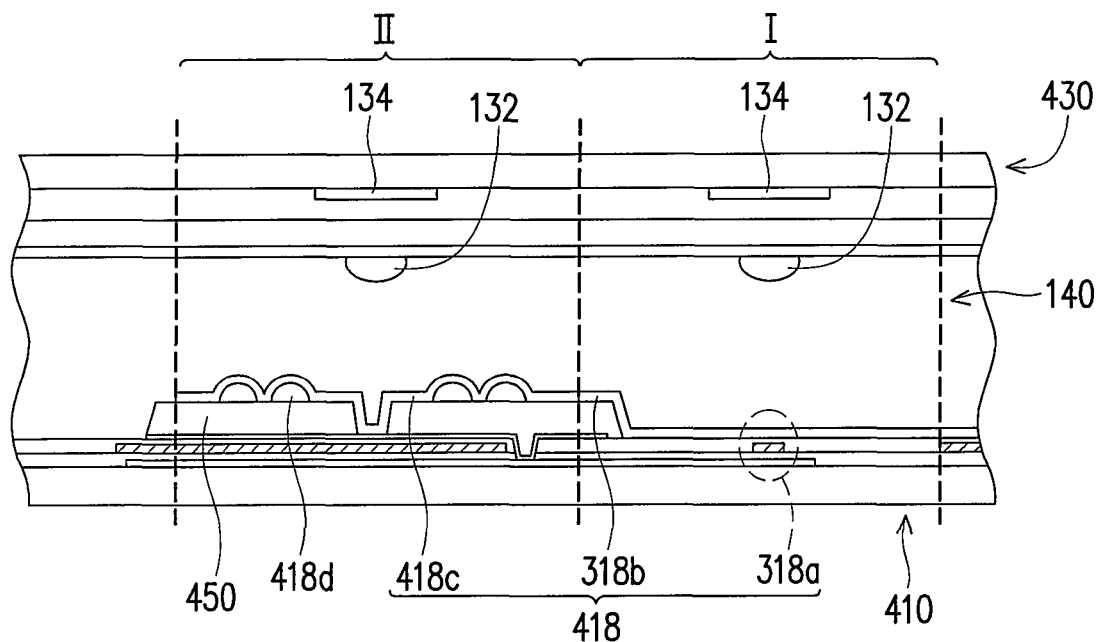

The LCD panel of the present embodiment is similar to the LCD panel 300. FIG. 4A shows a schematic top view of the LCD panel according to the fourth embodiment of the invention, and FIGS. 4B and 4C are schematic cross-sectional views of FIG. 4A along the sectioning line A-A'. First referring to FIG. 4A, an LCD panel 400 of the present embodiment is similar to the LCD panel 300. In the LCD panel 400, a second pixel electrode 418c in the second region II is a reflective electrode. In other word, the LCD panel 400 of the present embodiment is a transflective LCD panel.

As shown in FIGS. 4A and 4B, the scan line 114 is disposed under the transparent first pixel electrode 318b and located under the alignment protrusion 132. Furthermore, in order to reduce light leakage on the periphery of the alignment protrusion 132, the black matrix 134 can be disposed thereon or the scan lines 114 can be designed as having a plurality of ring-shaped patterns. Consequently, the first region I of the LCD panel 400 has a higher aperture ratio.

Generally, a planar reflective electrode usually has the problem of low reflectivity. Therefore, in the present embodiment, a plurality of bumps 418d are further disposed on an active device array substrate 410, and the second pixel electrode 418c covers the bumps 418d so that the reflectivity of the second pixel electrode 418c is increased.

Figure 4D:
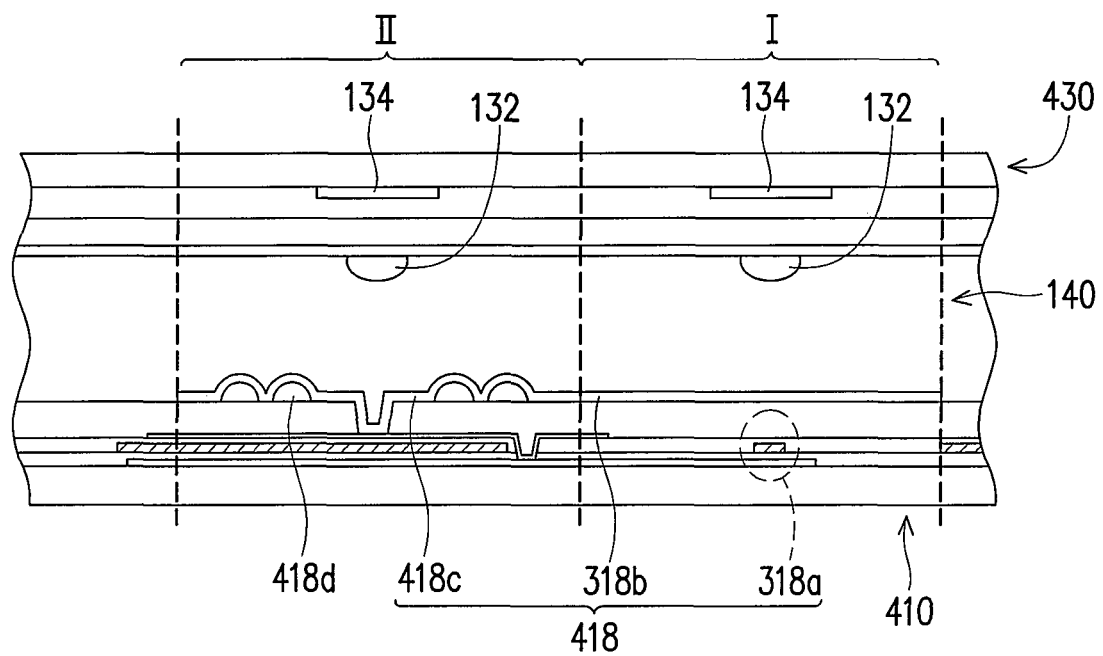
FIG. 4D is a schematic cross-sectional view of the LCD panel 400 without a pad layer.

Besides, when the LCD panel 400 is displaying images, since the optical path differences in the transparent display mode and the reflective display mode are different, the display quality in the first region I and the second region II may be inconsistent. Hence, in the present embodiment, a pad layer 450 can be disposed over the second pixel electrode 418c to mitigate the said situation. Referring to FIG. 4B, other than the said disposition, the pad layer 450 may also be disposed on an opposite substrate 430. Additionally, the pad layer 450 may also be disposed on an active device array substrate 410 and located under the second pixel electrode 418c as shown in FIG. 4C. Conceivably, devised with other different design concepts, the pad layer 450 does not have to be disposed in the LCD panel 400, whose cross-sectional view is illustrated as in FIG. 4D.

The Fifth Embodiment

Figure 5:
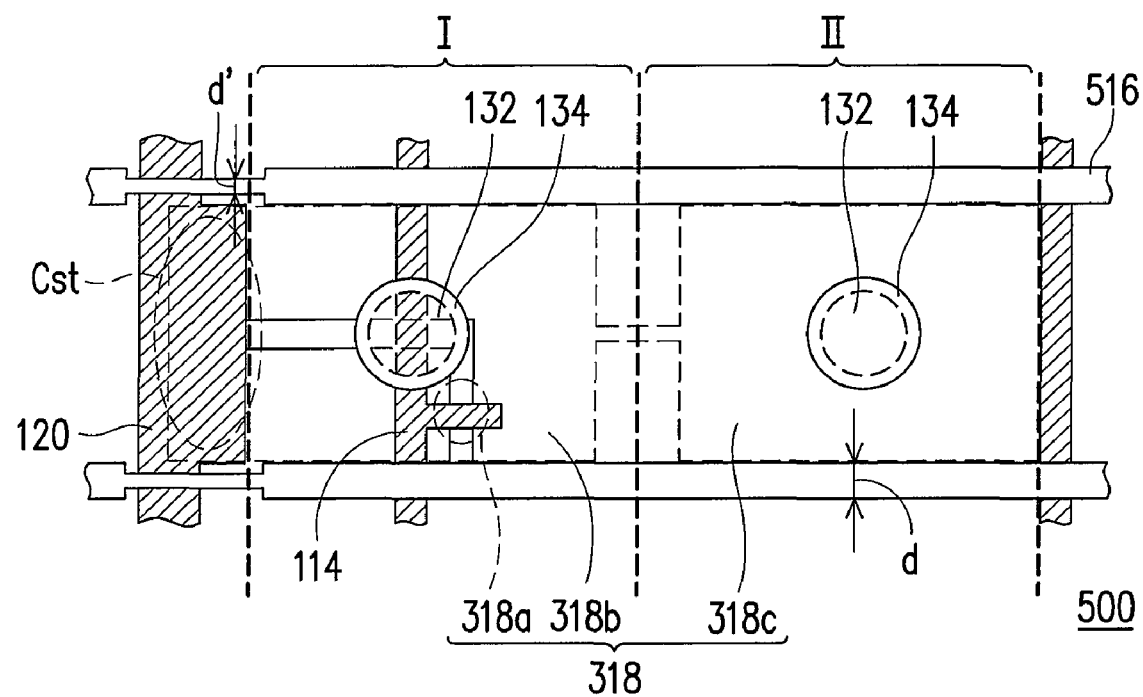
FIG. 5 is a schematic top view of the LCD panel of the fifth embodiment of the invention.

The storage capacitor of the LCD mentioned in the foregoing embodiments is formed by the common lines and the pixel electrode overlapped with the common lines. In order to keep the capacitance of the storage capacitor and prevent the adjacent conductive layers from affecting each other, the storage capacitor has to be extended from the common lines toward the inside of the pixel units and thereby affecting the aperture ratio of the LCD panel. Thus, the present embodiment provides an LCD panel as a solution to the said problem of reduced aperture ratio. FIG. 5 is a schematic top view of the LCD panel according to the fifth embodiment of the invention. Referring to FIG. 5, an LCD panel 500 of the present embodiment is approximately the same as the LCD panel 300. In the LCD panel 500, the variations in the width d of data lines 516 is proposed. In more detail, the width d' of a portion of the data lines 516 across with the common lines 120 and of a portion of the data lines 516 adjacent to the storage capacitor Cst is smaller than the width d of the other portions of the data lines 516. It is thus designed to extend the storage capacitor Cst toward the data lines 516 and avoid compromising the aperture ratio of the LCD panel 500.

In summary, in the LCD panel of embodiments of the present invention, the scan lines are disposed under the alignment protrusions so as to render the opaque scan lines and the black matrix corresponding to the alignment protrusions overlapped with each other and thereby reducing the loss in the aperture ratio of the LCD panel. Besides, in embodiments of the invention, the ring-shaped patterns of the scan lines are used to surround the periphery of the alignment protrusions such that the possible light leakage on the periphery of the alignment protrusions is reduced and the center of the alignment protrusions still remains transparent and thus increasing the aperture ratio of the LCD panel. It is not necessary to dispose any black matrix in the LCD panel to shield the possible light leakage, which in turn further reduces the fabrication cost. In addition, in the LCD panel of the invention, the data lines have different widths so that the storage capacitor can extend toward the data lines and the reduction in the aperture ratio caused by the disposition of the storage capacitor can be avoided.

Although the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A liquid crystal display (LCD) panel, comprising:
    an active device array substrate, comprising:
        a substrate;
        a plurality of scan lines and a plurality of data lines disposed on the substrate, and the scan lines having a plurality of ring-shaped patterns;
        a plurality of pixel units disposed on the substrate, wherein each of the pixel units is electrically connected to one of the scan lines and one of the data lines correspondingly and crosses two sides of the corresponding scan line;
    an opposite substrate having a plurality of alignment protrusions, wherein each of the alignment protrusions is located over the scan lines, and each of the ring-shaped patterns respectively located under one of the alignment protrusions so as to surround a periphery of each of the alignment protrusions; and
    a liquid crystal layer disposed between the opposite substrate and the active device array substrate.

2. The LCD panel of claim 1, wherein each of the pixel units comprises:
    an active device electrically connected to one of the scan lines and one of the data lines correspondingly; and
    a pixel electrode electrically connected to the active device.

3. The LCD panel of claim 2, wherein each of the pixel units has a first region and a second region.

4. The LCD panel of claim 3, wherein the alignment protrusions are located respectively over the first region and the second region.

5. The LCD panel of claim 3, wherein each of the pixel units has a first pixel electrode and a second pixel electrode located in the first region and the second region respectively.

6. The LCD panel of claim 5, wherein the first pixel electrode is a transparent electrode.

7. The LCD panel of claim 6, wherein the second pixel electrode is a transparent electrode.

8. The LCD panel of claim 7, wherein each of the scan lines is located under the first pixel electrode or the second pixel electrode.

9. The LCD panel of claim 6, wherein the second pixel electrode is a reflective electrode.

10. The LCD panel of claim 9, wherein each of the scan lines is located under the first pixel electrode.

11. The LCD panel of claim 9, wherein the active device array substrate further comprises a plurality of bumps disposed under the second pixel electrode.

12. The LCD panel of claim 9, wherein the active device array substrate further comprises a pad layer disposed under the second pixel electrode.

13. The LCD panel of claim 9, wherein the opposite substrate further comprises a pad layer located over the second pixel electrode.

14. The LCD panel of claim 1, wherein the ring-shaped patterns comprise polygonal frame pattern, circular frame pattern, or other geometric frame patterns.

15. The LCD panel of claim 1, wherein the opposite substrate further comprises a black matrix, disposed corresponding to the alignment protrusions.

16. The LCD panel of claim 1, wherein the active device array substrate further comprises a common line disposed among the pixel units.

17. The LCD panel of claim 16, wherein the common line and each of the pixel electrodes overlapped therewith form a storage capacitor.

18. The LCD panel of claim 17, wherein a width of a portion of the data lines across with each the common line and a portion of the data lines adjacent to the storage capacitor is smaller than a width of the other portion of the data lines.

19. An LCD panel, comprising:
  an active device array substrate, comprising:
    a substrate;
    a plurality of common lines and a plurality of data lines disposed on the substrate so as to define a plurality of pixel regions;
    a plurality of scan lines, each of the scan lines located between two adjacent common lines;
    a plurality of pixel units disposed on one of the pixel regions of the substrate respectively, wherein each of the pixel units is electrically connected to one of the scan lines and one of the data lines correspondingly;
  an opposite substrate having a plurality of alignment protrusions, wherein the alignment protrusions are located over the scan lines;
  a plurality of ring-shaped patterns, each of the ring-shaped patterns respectively located under one of the alignment protrusions so as to surround a periphery of each of the alignment protrusions; and
  a liquid crystal layer, disposed between the opposite substrate and the active device array substrate.

20. The LCD panel of claim 19, wherein each of the pixel units comprises:
  an active device electrically connected to one of the scan lines and one of the data lines correspondingly; and
  a pixel electrode electrically connected to the active device.

21. The LCD panel of claim 19, wherein the ring-shaped patterns are connected to the scan lines.

22. The LCD panel of claim 19, wherein the ring-shaped patterns comprise polygonal frame pattern, circular frame pattern or other geometric frame patterns.

* * * * *